(12) United States Patent
Edamatsu

(10) Patent No.: US 8,107,118 B2
(45) Date of Patent: Jan. 31, 2012

(54) PRINT CONTROL APPARATUS THAT CONTROLS PRINTING DEVICE PERFORMING PRINTING USING PRINT SHEET HAVING TAB

(75) Inventor: Tatsuo Edamatsu, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1161 days.

(21) Appl. No.: 11/543,763

(22) Filed: Oct. 6, 2006

(65) Prior Publication Data

US 2008/0014002 A1    Jan. 17, 2008

(30) Foreign Application Priority Data

Jul. 11, 2006  (JP) .................................. 2006-190538

(51) Int. Cl.
    *G06K 15/00* (2006.01)
(52) U.S. Cl. ......................... 358/1.18; 358/1.11; 283/36
(58) Field of Classification Search ........... 358/1.1–1.16
    See application file for complete search history.

(56) References Cited

U.S. PATENT DOCUMENTS

| | | | | |
|---|---|---|---|---|
| 5,182,152 A | * | 1/1993 | Ericson | 428/40.9 |
| 5,946,461 A | * | 8/1999 | Landry et al. | 358/1.18 |
| 6,279,018 B1 | * | 8/2001 | Kudrolli et al. | 715/234 |
| 6,758,471 B2 | * | 7/2004 | Hirako | 271/258.01 |
| 7,298,521 B2 | * | 11/2007 | Hayashi | 358/1.18 |
| 2003/0070146 A1 | | 4/2003 | Sato et al. | |
| 2004/0184103 A1 | * | 9/2004 | Kremer et al. | 358/1.18 |
| 2004/0263869 A1 | * | 12/2004 | Kimura | 358/1.1 |

FOREIGN PATENT DOCUMENTS

| | | |
|---|---|---|
| JP | 55-159164 | 11/1980 |
| JP | 63-128078 | 8/1988 |
| JP | 64-030200 | 2/1989 |
| JP | 05-165829 | 7/1993 |
| JP | 2003-260843 | 9/2003 |
| JP | 2003-296312 | 10/2003 |
| JP | 2004-151505 | 5/2004 |
| JP | 2004-199359 | 7/2004 |
| JP | 2005-196692 | 7/2005 |

* cited by examiner

*Primary Examiner* — Benny Tieu
*Assistant Examiner* — Michael Tzeng
(74) *Attorney, Agent, or Firm* — Buchanan Ingersoll & Rooney PC

(57) ABSTRACT

Upon printing on a tab, a printer driver presents a screen for setting index information of a tab sheet, and receives designation of a position where an index is to be added and an item to be added to the index. Further, it receives designation of the number of letters, letter size, or the number of lines as a threshold value for determining whether the title information input to be printed on the tab should be converted into an index or not. When the input title information exceeds the threshold value, the printer driver controls such that one or more alphanumeric characters are printed on a tab, instead of the title information, and such that the input title information is printed on an index sheet together with the alphanumeric character(s) of the corresponding tab sheet.

17 Claims, 18 Drawing Sheets

FIG. 9

TAB SHEET SETTING

LIST NAME: LIST 1

PAPER SIZE(S): A4

NUMBER OF TABS(N): 5

POSITION ADJUSTMENT
UPPER MARGIN(V): 34 mm [0..50]
LOWER MARGIN(B): 34 mm [0..50]
INTERVAL(G): 10 mm [0..20]
LETTER POSITION(P): 0 mm [−10...10]

UPPER MARGIN — INTERVAL — LOWER MARGIN
1/5  2/5  3/5  4/5  5/5
LETTER POSITION

401

OK    CANCEL    RETURN TO DEFAULT(D)    HELP(H)

FIG.15

| UI SETTING OF DRIVER | | ITEMS ADDED TO INDEX INFORMATION (INDEX INFORMATION TO BE PRINTED) | | | |
|---|---|---|---|---|---|
| PAGE NUMBER | TAB POSITION | COLOR INFORMATION OF TAB SHEET | TAB POSITION | PAGE NUMBER (WITH RESPECT TO TOTAL PAGE COUNT) | PAGE NUMBER (BASED ON TAB POSITION) |
| 1 | 1/5 | GREY | 1/5 | 01/90 | 1/2 |
| 10 | 2/5 | GREEN | 2/5 | 10/90 | 1/2 |
| 20 | 3/5 | YELLOW | 3/5 | 20/90 | 1/2 |
| 30 | 4/5 | ORANGE | 4/5 | 30/90 | 1/2 |
| 40 | 5/5 | LIGHT BLUE | 5/5 | 40/90 | 1/2 |
| 50 | 1/5 | GREY | 1/5 | 50/90 | 2/2 |
| 60 | 2/5 | GREEN | 2/5 | 60/90 | 2/2 |
| 70 | 3/5 | YELLOW | 3/5 | 70/90 | 2/2 |
| 80 | 4/5 | ORANGE | 4/5 | 80/90 | 2/2 |
| 90 | 5/5 | LIGHT BLUE | 5/5 | 90/90 | 2/2 |

PRINT CONTROL APPARATUS THAT CONTROLS PRINTING DEVICE PERFORMING PRINTING USING PRINT SHEET HAVING TAB

This application is based on Japanese Patent Application No. 2006-190538 filed with the Japan Patent Office on Jul. 11, 2006, the entire content of which is hereby incorporated by reference.

BACKGROUND OF THE INVENTION

1. Field of the Invention

The present invention relates to a print control apparatus, a print control program product and a print control method, and particularly to a print control apparatus, a print control program product and a print control method for controlling a printing device that performs printing using a print sheet having a tab.

2. Description of the Related Art

A printing device that performs printing using a print sheet having a tab (hereinafter, referred to as a "tab sheet") has been proposed.

For example, Japanese Laid-Open Patent Publication No. 2004-151505, previously filed by the applicant and now published (hereinafter, "Patent Document 1"), discloses an image forming apparatus capable of inserting a tab sheet of a desired tab position into a desired page position by detecting whether a fed sheet is a tab sheet or not and also by detecting the tab position and the tab direction before a transferring operation.

When the image forming apparatus as disclosed in Patent Document 1 is used to print information for use as a title on a tab, however, if the amount of the information is large (the number of letters is large, for example), it would be necessary to reduce the size of display such that the information is fitted in the limited space on the tab, leading to degradation in visibility. As such, there is a limit for the amount of information that can be printed on the tab, resulting in a problem that information of large quantity cannot be presented.

Further, when the number of tab sheets included in a set of printed matter increases, it would be difficult to search for necessary information.

SUMMARY OF THE INVENTION

The present invention provides a print control apparatus, a print control program product and a print control method for controlling a printing device such that information of large quantity can be presented without impairing visibility of the information printed on a tab.

According to an aspect of the present invention, a print control apparatus controls a printing device performing printing on a tab sheet identified as a print sheet having a tab, and includes: an input unit inputting title information identified as information to be printed on the tab; and a first generating unit generating control information for printing index information of the tab sheet on an index sheet, based on the title information.

According to another aspect of the present invention, a print control program product causes a computer to execute processing for controlling a printing device performing printing on a tab sheet identified as a print sheet having a tab. The processing includes the steps of: presenting an input screen to a user and receiving an input of title information identified as information to be printed on the tab according to the input screen; and generating control information for printing index information of the tab sheet on an index sheet based on the title information.

According to a further aspect of the present invention, a print control method is for controlling a printing device performing printing on a tab sheet identified as a print sheet having a tab using a print control apparatus. The method includes: a step of presenting an input screen to a user and receiving an input of title information identified as information to be printed on the tab according to the input screen; and a first generating step of generating control information for printing index information of the tab sheet on an index sheet based on the title information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 shows a specific example of a screen for performing tab sheet setting.

FIG. 15 illustrates a specific example of settings related to index sheets and index sheet information.

DESCRIPTION OF THE PREFERRED EMBODIMENTS

Figure 1:
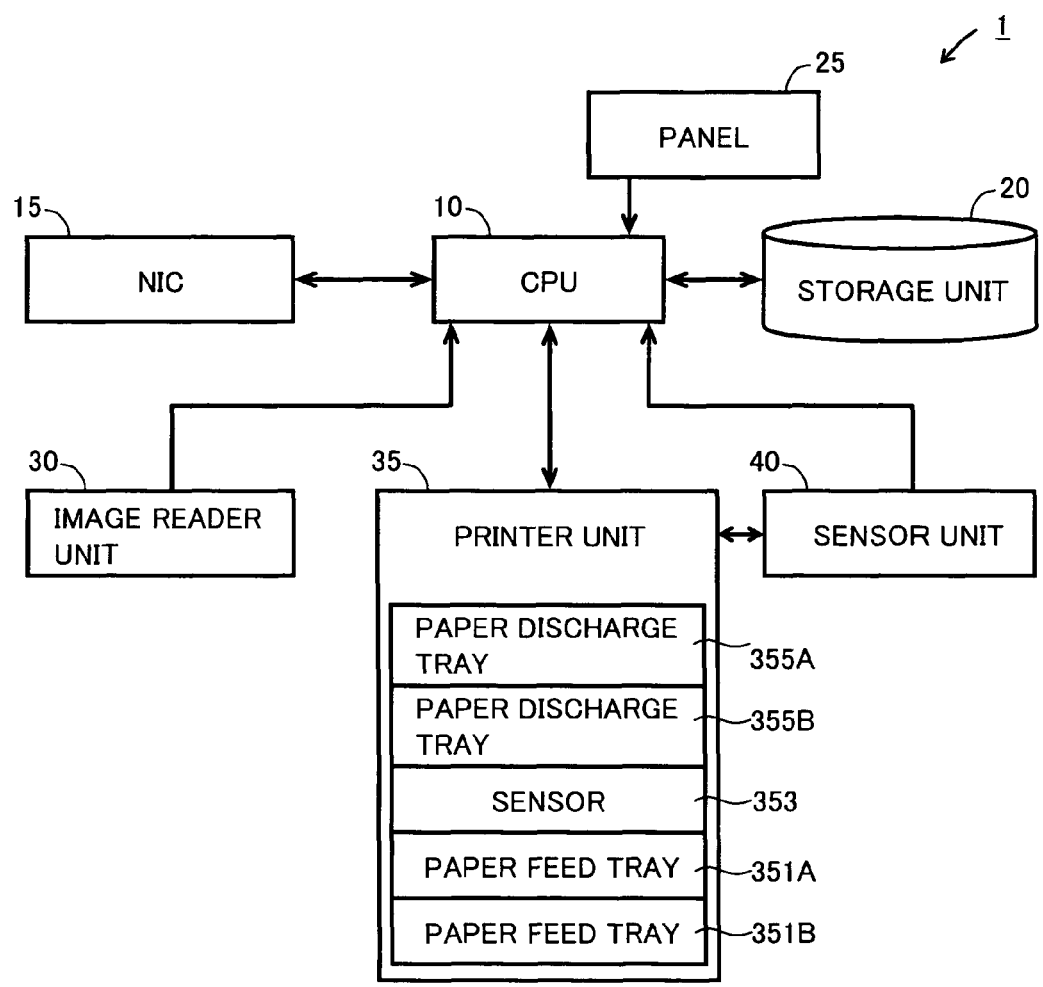
FIG. 1 is a block diagram showing a specific example of hardware configuration of a printing device 1 that is an MFP (Multi Function Peripheral).

Hereinafter, an embodiment of the present invention will be described with reference to the drawings. In the following, the same units and elements have the same reference characters allotted, and their designations and functions are identical.

A print system according to the present embodiment includes a printing device 1 and a personal computer (hereinafter, abbreviated as "PC") 3, serving as a print control apparatus, connected to printing device 1 via a wired or wireless network.

In the present embodiment, printing device 1 performs printing on a print sheet having a tab. In the following, the print sheet having a tab is referred to as a "tab sheet", and the information to be printed on a tab portion or the like of the tab sheet and used to search a printed document is referred to as "title information". Further, printing device 1 of the present embodiment performs, not only printing on a tab sheet, but also printing of an index used to search for a tab sheet. The information to be printed as the index is referred to as "index information". Further, the print sheet on which the index is to be printed is referred to as an "index sheet".

Printing device 1 may be a printer, a copier, an MFP (Multi Function Peripheral) as a combination thereof, or the like. It is assumed in the present embodiment that printing device 1 is an MFP.

Referring to FIG. 1, printing device 1 includes: a CPU (Central Processing Unit) 10 controlling the entire device; an image reader unit 30 reading image data from an original; a printer unit 35 printing an image on a sheet of paper; a NIC (Network Interface Card) 15 that is an expansion card inserted into an expansion slot (not shown) for connecting printing device 1 to a network or a telephone line, or for performing close-range radio communication; a storage unit 20 formed of a HD (Hard Disk), a RAM (Random Access Memory) and the like for storing a job, a program executed by CPU 10 and the like; a panel 25 that is an interface with a user; and a sensor unit 40 detecting the remaining amounts of the print sheets, toner and the like. Printer unit 35 includes a paper feed tray 351A for sheets of plain paper, a paper feed tray 351B for tab sheets, a sensor 353 detecting a shape of the sheet fed from paper feed trays 351A and 351B, a paper discharge tray 355A for discharging a printed sheet, and a paper discharge tray 355B for discharging an undesignated sheet.

Sensor 353 detects whether the fed sheet is a tab sheet or not, and also detects the size, tab position and tab direction of the tab sheet. The detection method used by sensor 353 is not restricted to a particular method in the present invention; it may use any detection method available. For example, the detection method described in Japanese Laid-Open Patent Publication No. 2004-151505 previously filed by the applicant and now published may be used.

Figure 2:
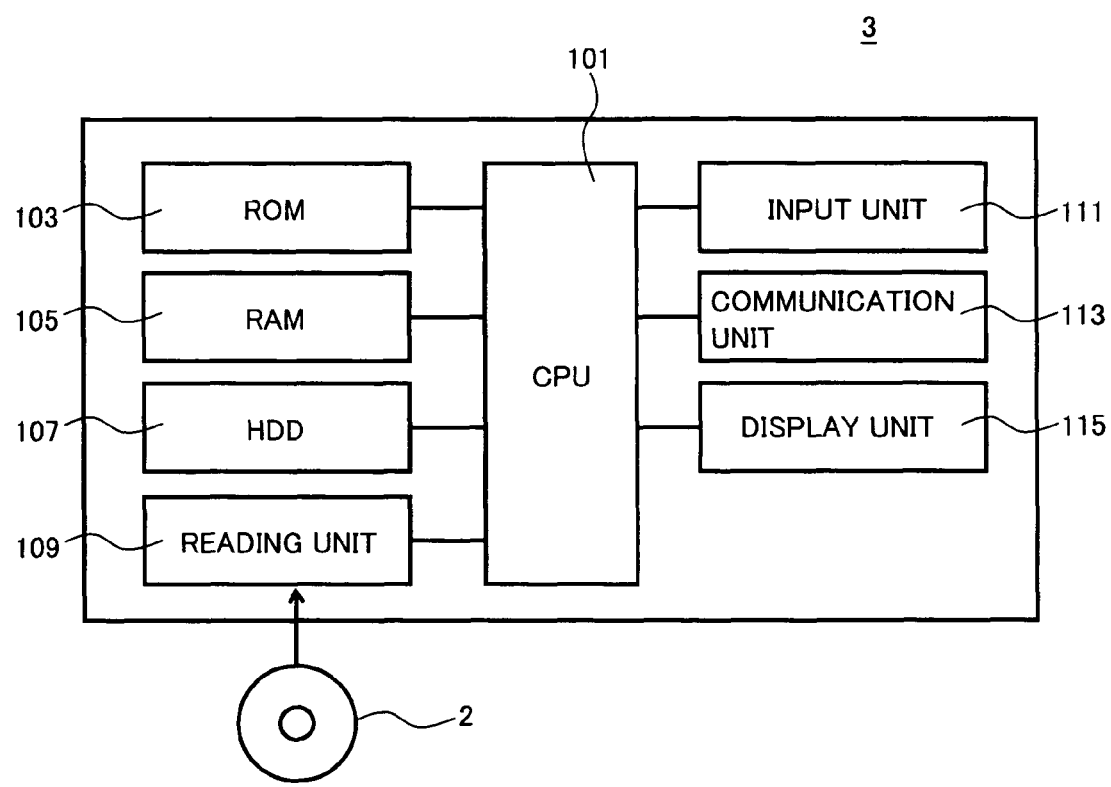
FIG. 2 is a block diagram showing a specific example of hardware configuration of a PC 3.

FIG. 2 is a block diagram showing a specific example of hardware configuration of a common personal computer, as a specific example of the hardware configuration of PC 3. Referring to FIG. 2, PC 3 includes: a CPU 101 controlling the entire device; a ROM (Read Only Memory) 103; a RAM (Random Access Memory) 105; a hard disk drive 107; a reading unit 109 reading information from a recording medium 2, such as a FDD (Flexible Disk Drive) or a CD-ROM (Compact Disk-Read Only Memory) drive; an input unit 111 formed with a keyboard, mouse and the like; a communication unit 113 for connecting to the network or for communicating with the outside; and a display unit 115.

Figure 3:
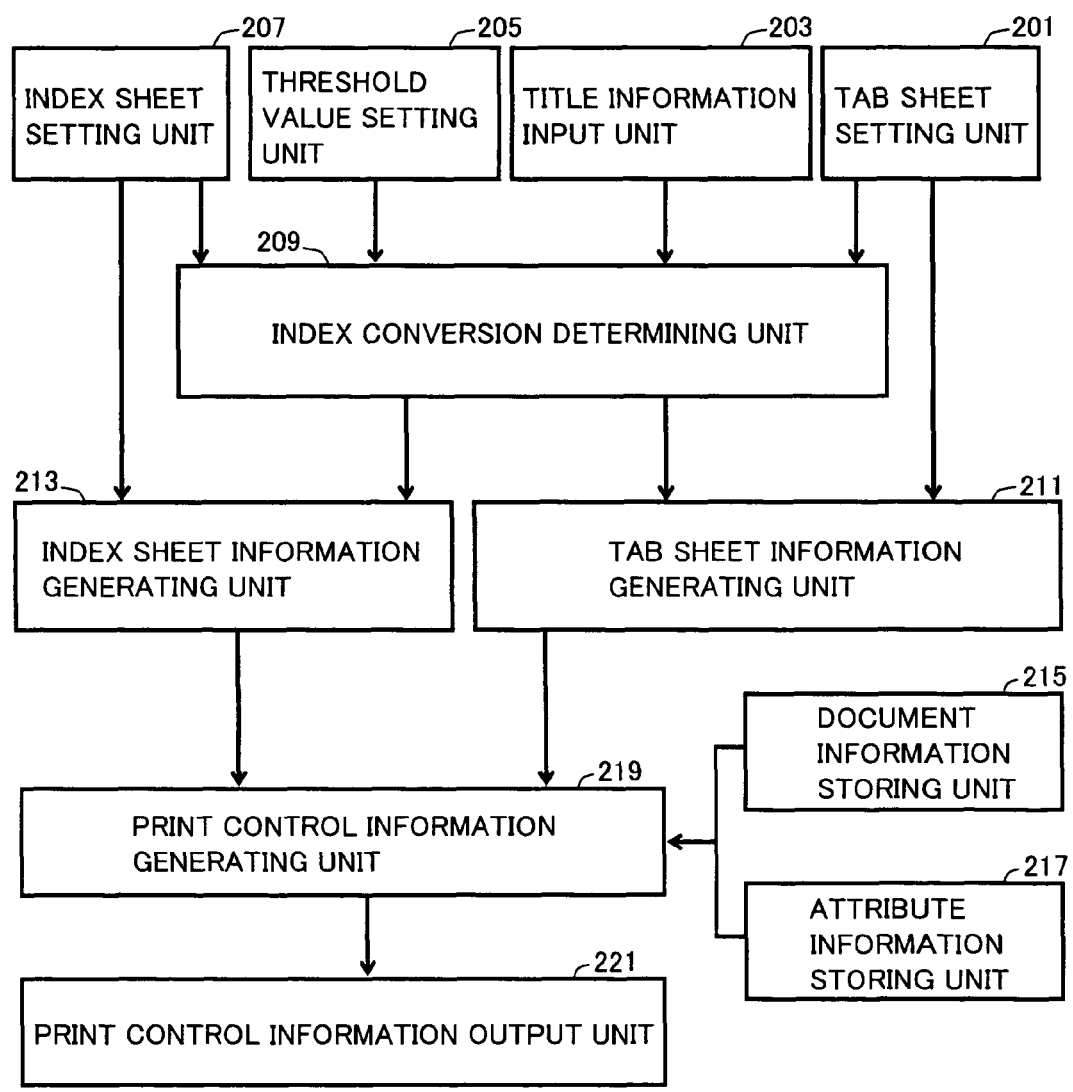
FIG. 3 is a block diagram showing a specific example of functional configuration of PC 3.

FIG. 3 is a block diagram showing a specific example of functional configuration of PC 3 for causing printing device 1 to perform printing using a tab sheet. The functions shown in FIG. 3 are implemented primarily on CPU 101 of PC 3 as CPU 101 reads and executes a program, stored in ROM 103 or the like, that is a printer driver for performing instructing operations to printing device 1. Alternatively, at least a part thereof may be realized with the hardware configuration of PC 3 shown in FIG. 2.

Referring to FIG. 3, the above-described functions of PC 3 include a tab sheet setting unit 201, a title information input unit 203, a threshold value setting unit 205, an index sheet setting unit 207, an index conversion determining unit 209, a tab sheet information generating unit 211, an index sheet information generating unit 213, a document information storing unit 215, an attribute information storing unit 217, a print control information generating unit 219, and a print control information output unit 221.

Tab sheet setting unit 201 receives, via input unit 111, setting related to the shape of a tab sheet to be used, including the size of the tab sheet, the number of tabs and the like, setting related to the output manner of the tab portion, including the number of letters to be printed on the tab, the letter size and the like, and setting of the tab sheet insert position, representing which tab sheet is to be inserted to which page of document information that is a target for tab sheet insertion, and provides the same to index conversion determining unit 209 and tab sheet information generating unit 211.

Index sheet setting unit 207 receives, via input unit 111, setting as to whether or not to print an index, setting of the print sheet to be used as an index sheet, and setting of information regarding the items to be added to the index information, and provides the same to index conversion determining unit 209 and index sheet information generating unit 213.

Title information input unit 203 receives an input of the title information via input unit 111, and provides the same to index conversion determining unit 209.

Threshold value setting unit 205 receives, via input unit 111, an input of a threshold value that serves as the criterion as to whether the title information is to be printed on a tab sheet or to be printed on an index sheet, and provides the same to index conversion determining unit 209.

Index conversion determining unit 209 determines whether the title information received from title information input unit 203 can be printed on a tab of the tab sheet or not, based on the settings related to the tab sheet and the index sheet received from tab sheet setting unit 201 and index sheet setting unit 207, as well as the threshold value received from threshold value setting unit 205, and when it determines that the title information cannot be printed on the tab, it converts the title information so as to be printed on an index sheet, based on the setting related to the index sheet received from index sheet setting unit 207. The title information, or the converted title information, is provided to tab sheet information generating unit 211 or index sheet information generating unit 213.

Tab sheet information generating unit 211 generates tab sheet information for causing printing device 1 to perform printing on a tab sheet, including the information received from the above-described tab sheet setting unit 201 and title information input unit 203, and provides the same to print control information generating unit 219. Further, index sheet information generating unit 213 generates index sheet information for causing printing device 1 to perform printing of an index, including the information received from the above-described index sheet setting unit 207 and title information input unit 203, and provides the same to print control information generating unit 219.

Document information storing unit 215 stores document information generated by PC 3 or document information generated by another device and supplied to PC 3. Attribute information storing unit 217 stores attribute information representing attributes used for printing the document information, such as information of the creator of the document information, information about the typestyle, and the like. It is noted that the attribute information may be stored in document information storing unit 215 as a pair with the corresponding document information. Print control information generating unit 219 specifies the document information to be printed based on an input from input unit 111, and retrieves the relevant document information from document information storing unit 215. It further retrieves the corresponding attribute information from attribute information storing unit 217. Print control information generating unit 219 uses the tab sheet information received from tab sheet information generating unit 211, the index sheet information received from index sheet information generating unit 213, and the document information and attribute information retrieved, to generate print control information for causing printing device 1 to generate an image to be printed, and provides the same to print control information output unit 221.

Figure 4:
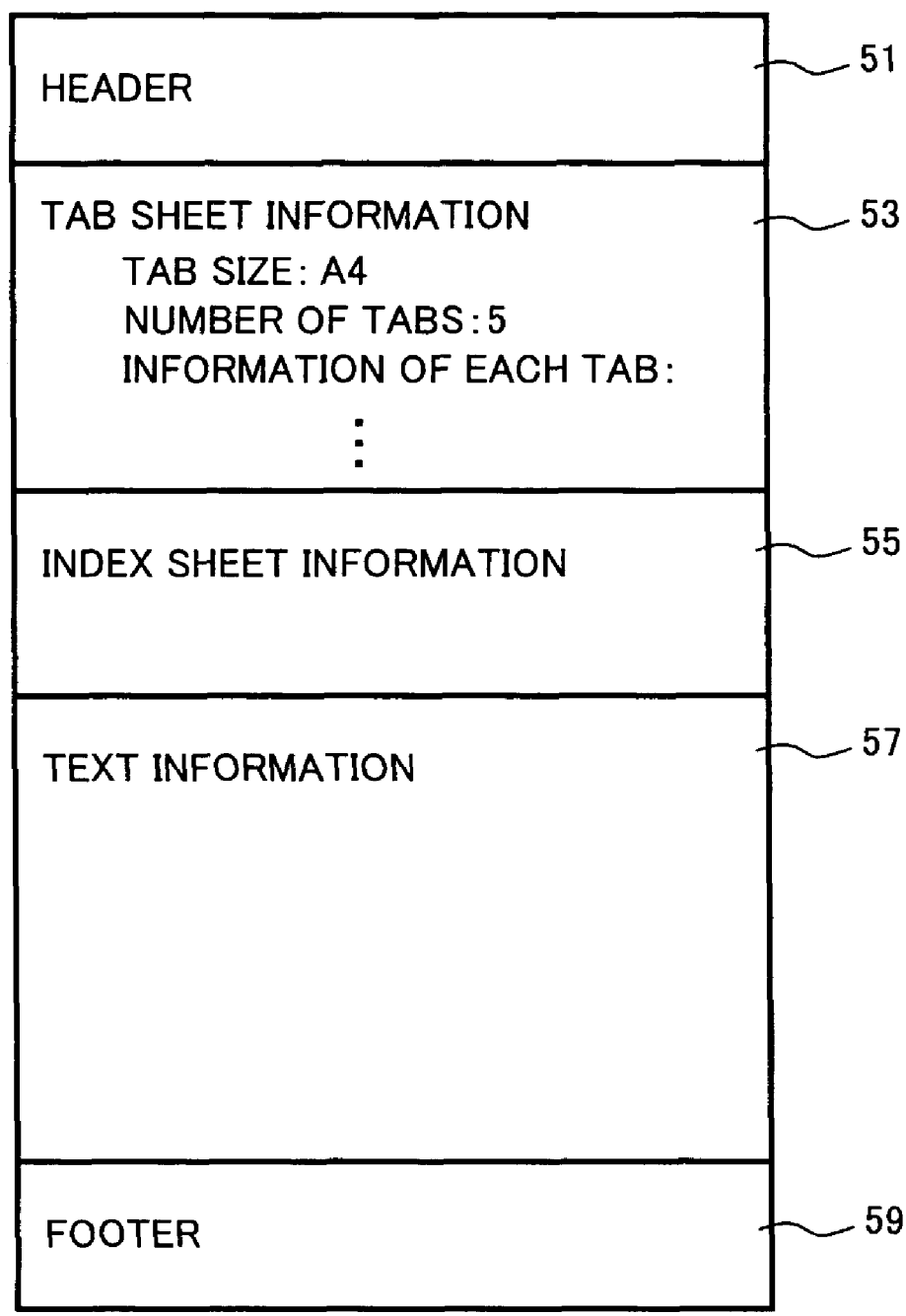
FIG. 4 illustrates an example of configuration of print control information.

FIG. 4 shows a configuration example of print control information generated by print control information generating unit 219. As shown in FIG. 4, the print control information generated by PC 3 includes, in addition to a header 51, text information 57 and a footer 59, tab sheet information 53 containing the above-described tab sheet information, and index sheet information 55 containing the above-described index sheet information. Tab sheet information 53 includes information about the entire tab sheet, such as the tab size, the number of tabs and the like as shown in FIG. 4, and also includes information about each tab sheet, such as information specifying the position (page) in target document information to which the relevant tab sheet is to be inserted and information specifying the paper feed tray containing the relevant tab sheet, as well as information of title letters to be printed on the tab and the like, which are included in the form of commands for causing printing device 1 to form a tag image. Index sheet information 55 includes information about the entire index sheet, such as the type of the sheet for use in printing, the insert position in the target document information and the like, and also includes information related to the tab sheet to be printed on the index sheet, such as information about letters and images to be printed, including title letters, and colors to be applied, which are included in the form of commands for causing printing device 1 to form an index image. The print control information as shown in FIG. 4 is described in PDL (Page Description Language), PGL (Page Graphic Language) or the like, which is converted into a print image of bit map data in printing device 1, for printing.

The print control information, of which an example is shown in FIG. 4, is output from print control information output unit 221 to printing device 1.

Figure 5:
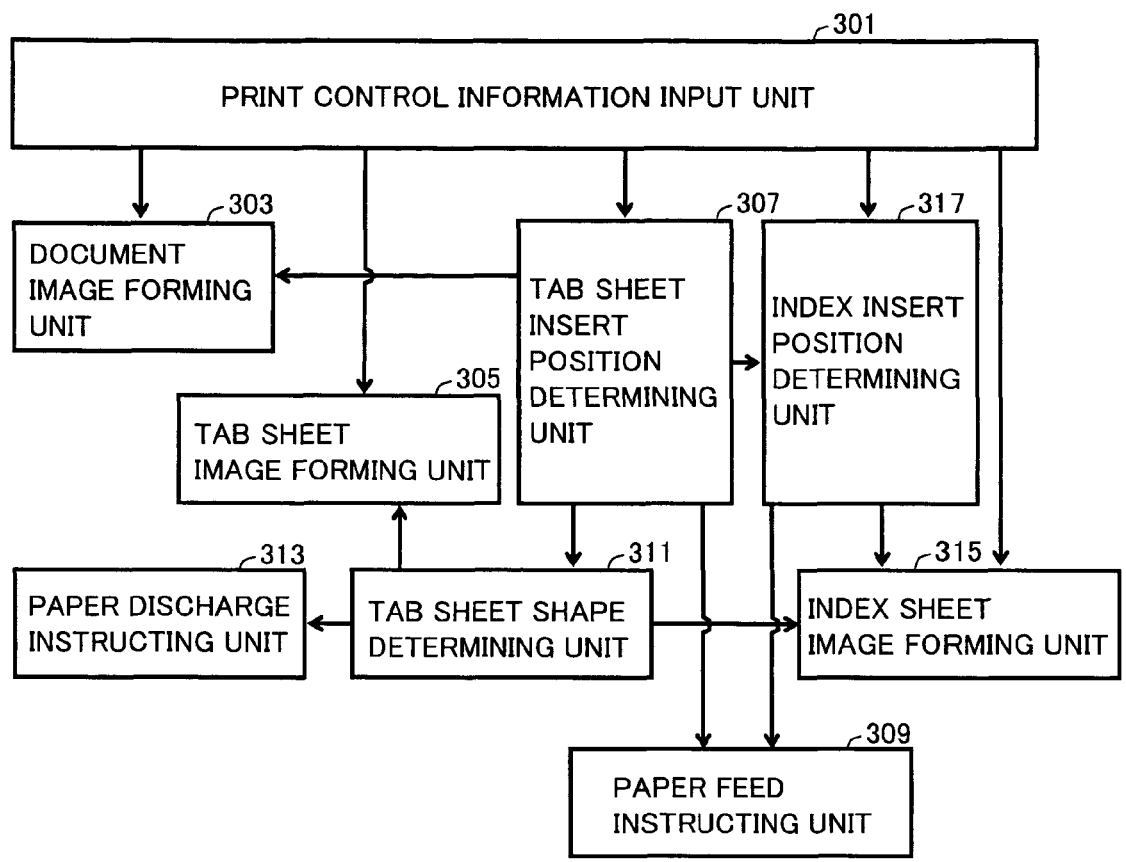
FIG. 5 is a block diagram showing a specific example of functional configuration for performing printing of an index in printing device 1.

FIG. 5 is a block diagram showing a specific example of functional configuration for performing printing of an index in printing device 1. The functions shown in FIG. 5 are implemented in CPU 10 of printing device 1 as CPU 10 reads and executes a program stored in storage unit 20. Alternatively, at least a part thereof may be realized with the hardware configuration shown in FIG. 1.

Referring to FIG. 5, the above-described functions of printing device 1 include a print control information input unit 301, a document image forming unit 303, a tab sheet image forming unit 305, a tab sheet insert position determining unit 307, a paper feed instructing unit 309, a tab sheet shape determining unit 311, a paper discharge instructing unit 313, an index sheet image forming unit 315, and an index insert position determining unit 317.

Print control information input unit 301 receives the above-described print control information output from PC 3, and provides the same to document image forming unit 303, tab sheet image forming unit 305, tab sheet insert position determining unit 307, index insert position determining unit 317, and index sheet image forming unit 315.

Tab sheet insert position determining unit 307 determines, based on tab sheet information 53, whether the page to be printed next corresponds to a page for inserting a tab sheet or a page for printing the document, and in the case where the page is for printing the tab sheet, it also determines the shape of the tab sheet to be used for printing, and provides the determined results to document image forming unit 303, paper feed instructing unit 309, tab sheet shape determining unit 311, and index insert position determining unit 317.

Index insert position determining unit 317 determines, based on index information 55, whether the page to be printed next corresponds to a page for inserting an index or not, and also determines, further based on the determined result of tab sheet insert position determining unit 307, whether the tab sheet to be inserted next corresponds to the tab sheet for printing an index or not, and provides the determined results to index sheet image forming unit 315 and paper feed instructing unit 309.

Paper feed instructing unit 309 instructs printer unit 35 to feed a print sheet of a normal shape for use in printing a document in the case where the result of determination in tab sheet insert position determining unit 307 indicates that the page is for printing the document, while it instructs printer unit 35 to feed a tab sheet of a relevant shape in the case where the page is for printing a tab sheet. It further instructs printer unit 35 to feed a print sheet of a normal shape for use in printing an index in the case where the result of determination in index insert position determining unit 317 indicates that the page is for inserting an index by printing the index on the print sheet of the normal shape.

When the determined result of tab sheet insert position determining unit 307 indicates that the page is for printing a tab sheet, tab sheet shape determining unit 311 determines whether a print sheet fed is a tab sheet or not, based on a sensor signal from sensor 353, and also determines whether the fed sheet is the tab sheet having the shape determined by tab sheet insert position determining unit 307 or not, and provides the determined results to tab sheet image forming unit 305 or paper discharge instructing unit 313. It further provides the determined results to index sheet image forming unit 315 in the case where the determined result of index insert position determining unit 317 indicates that the tab sheet to be printed next corresponds to the tab sheet for printing an index.

When it is determined in tab sheet shape determining unit 311 that the fed print sheet is not a tab sheet even though the page is for inserting the tab sheet, or that the fed print sheet is not the tab sheet of a proper shape, paper discharge instructing unit 313 instructs printer unit 35 to discharge the relevant sheet to paper discharge tray 355B for use in discharging an undesignated sheet.

When the determined result of tab sheet insert position determining unit 307 indicates that the page is for printing the document, document image forming unit 303 forms a document image being bit map data for printing the document based primarily on text information 57, and provides the same to printer unit 35.

When the determined result of tab sheet insert position determining unit 307 indicates that the page is for printing a tab sheet and when it is determined in tab sheet shape determining unit 311 that a proper tab sheet has been fed, then tab sheet image forming unit 305 forms a tab sheet image being bit map data for printing information set for the tab sheet and for coloring the tab sheet with the color set therefor, based primarily on tab sheet information 53, and provides the same to printer unit 35.

When the determined result of index insert position determining unit 317 indicates that the page is for printing an index, or in the case where the page is for printing an index and the index is to be printed on a tab sheet and when it is determined in tab sheet shape determining unit 311 that a proper tab sheet has been fed, then index sheet image forming unit 315 forms an index sheet image being bit map data for printing an index, based primarily on index sheet information 55, and provides the same to printer unit 35.

Figure 6:
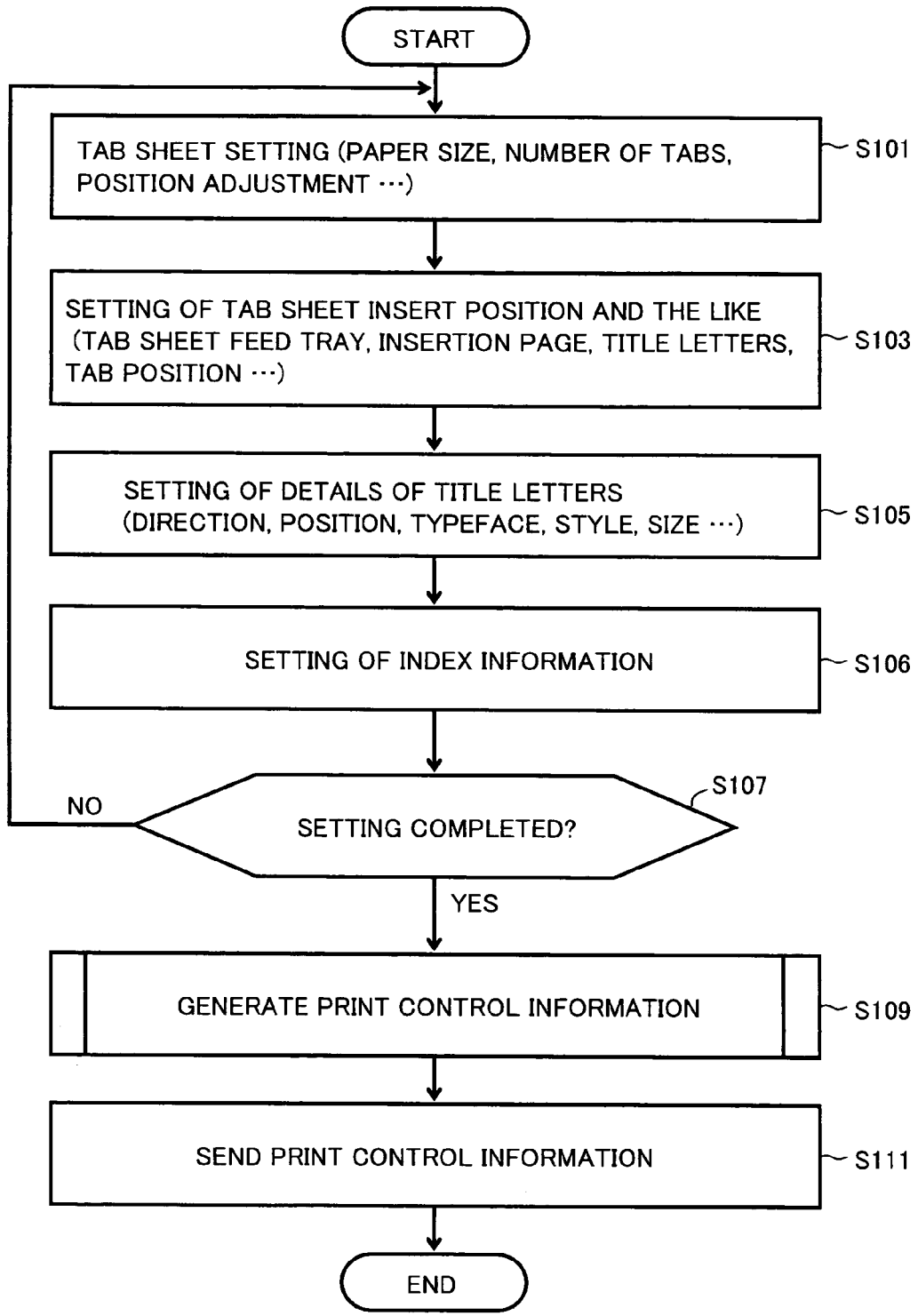
FIG. 6 is a flowchart showing processing executed by PC 3 for causing printing device 1 to perform printing using a tab sheet.
Figure 7:
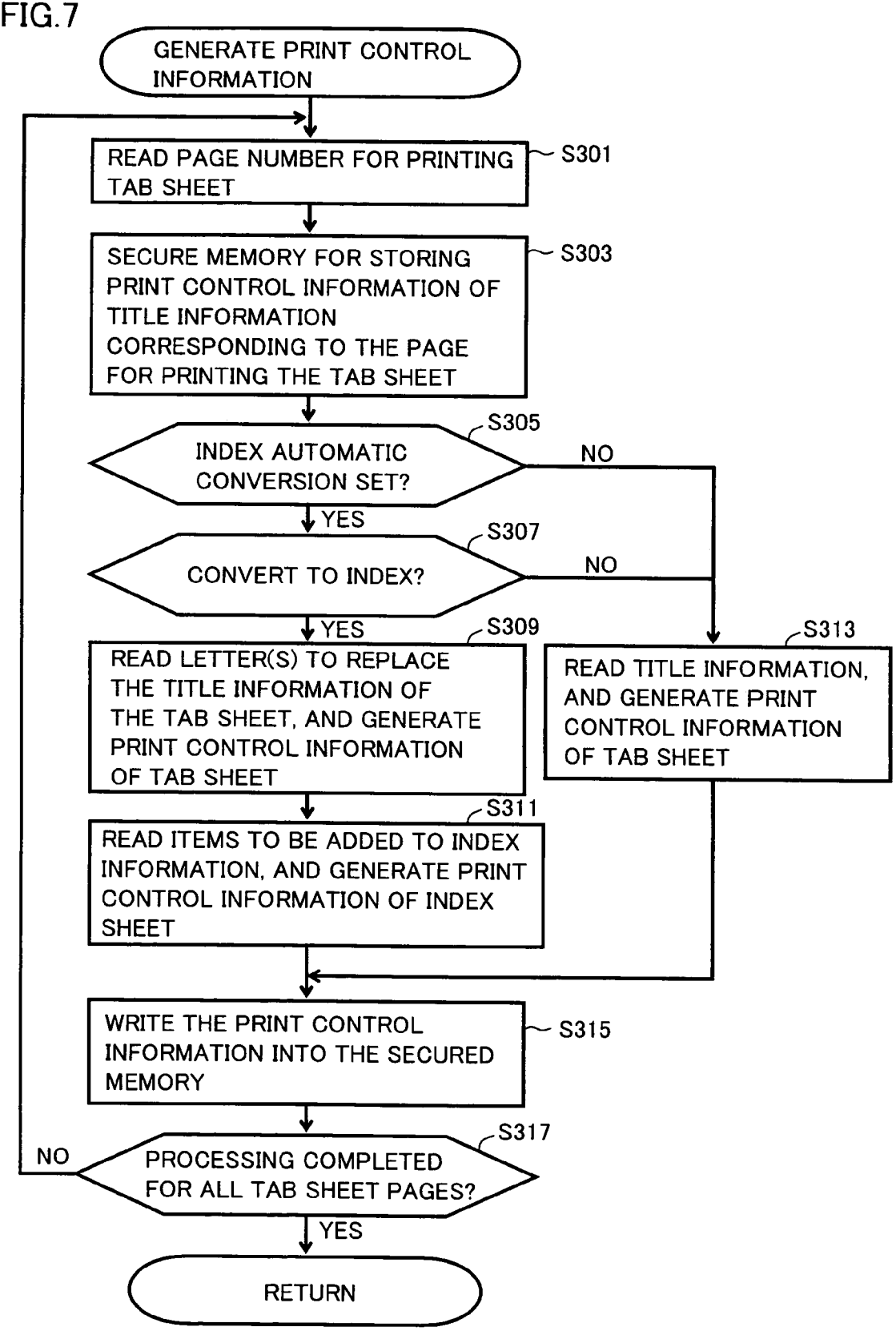
FIG. 7 is a flowchart showing an example of processing of generating print control information in step S109.

Processing executed by PC 3 of the present embodiment for causing printing device 1 to perform printing using a tab sheet, shown by flowcharts in FIGS. 6 and 7, is implemented as CPU 101 of PC 3 reads and executes a program stored in ROM 103 or the like, to control the units shown in FIG. 3.

FIGS. 8-13 are screens displayed when a printer driver is activated in PC 3 and manipulation for causing printing device 1 to perform printing using a tab sheet is conducted. They show specific examples of the screens displayed in the respective processing in the flowchart of FIG. 6, as well as the contents of the screens.

Figure 8:
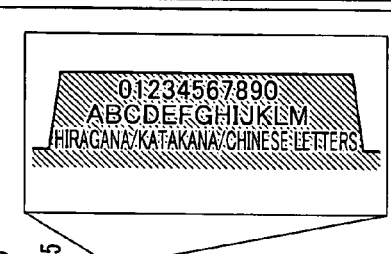
FIG. 8 shows a specific example of a screen for performing print setting on a per-page basis.

FIG. 8 shows a specific example of a user interface screen that is displayed when the printer driver is activated and manipulation for conducting setting on a per-page basis is performed on a print setting screen (not shown) for performing print setting on printing device 1. It shows a specific example of the screen for performing setting of printing of a tab on a per-page basis. When a button 501 for tab sheet setting is depressed on the screen shown in FIG. 8, step S101 in the flowchart of FIG. 6 is carried out, with a tab sheet setting screen shown in FIG. 9 being displayed. In step S101, information regarding the shape of the tab sheet (size, number of tabs and the like) as well as setting of the shape of the tab title (upper margin, lower margin, interval, letter position and the like) are received according to the screen shown in FIG. 9. It is preferable that the screen of FIG. 9 includes a preview screen 401, on which a preview of the tab sheet is displayed in response to input of the above setting to reflect the input.

Next, in step S103 of the flowchart in FIG. 6, settings including a position for inserting a tab sheet in target document information are received for each tab sheet, via input columns 503, 505, 507 and the like on the per-page setting screen shown in FIG. 8. More specifically, referring to FIG. 8, input column 503 for setting a page number receives an input of the page number where a tab sheet is to be inserted. Input column 505 for setting a tab position receives selection of "continuous from the previous page" or an arbitrary tab position (first from the top, second from the top, or the like). Input column 507 for setting title letters receives an input of a text as title information. Here, a text of a plurality of lines may be received using a line feed operation.

Figure 10:
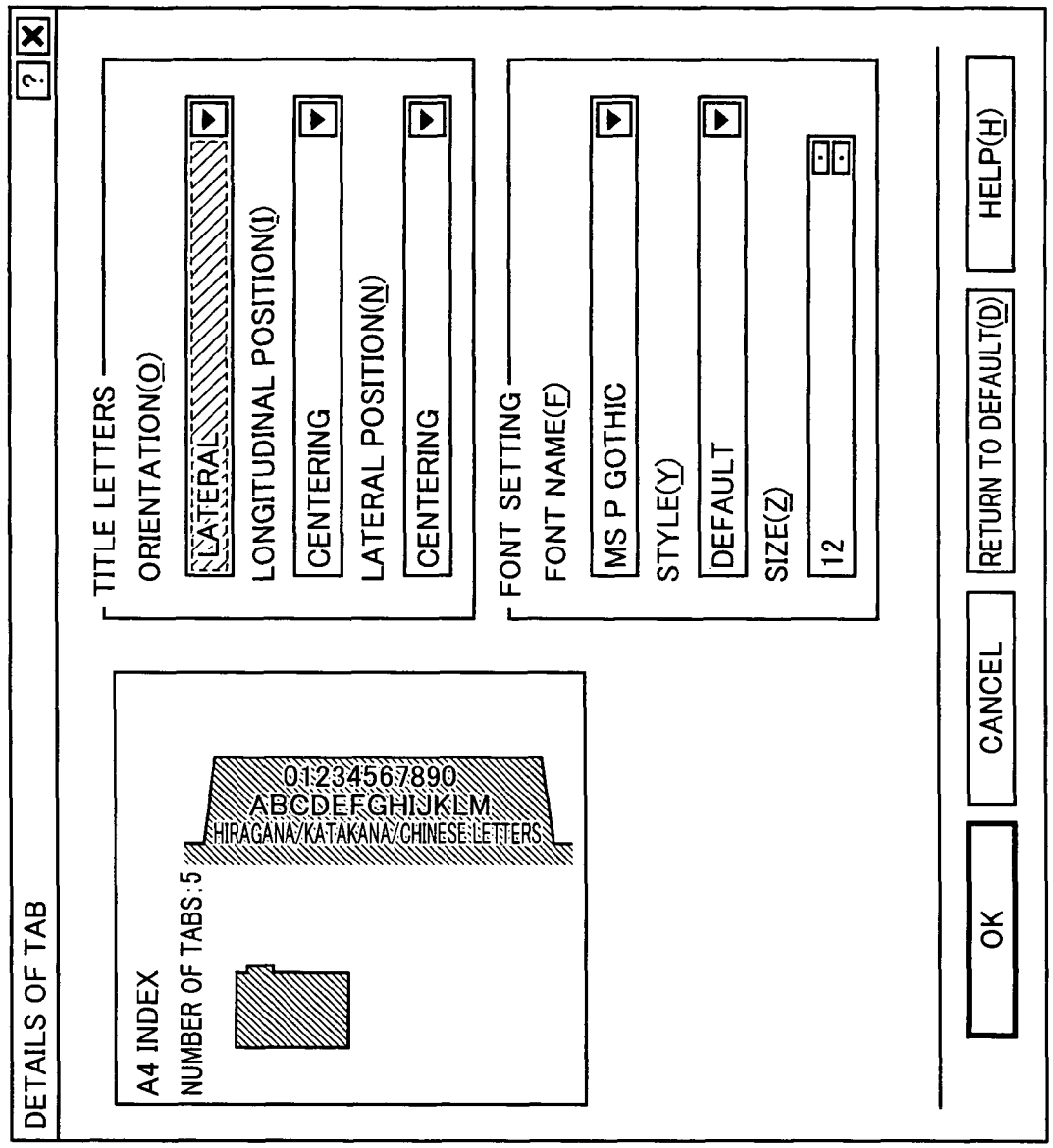
FIG. 10 shows a specific example of a screen for setting details for printing title information on a tab.

Next, when a button 509 for setting details of the title information is depressed on the per-page setting screen shown in FIG. 8, step S105 in the flowchart of FIG. 6 is executed, with a screen for setting details for printing the title information on the tab, as shown in FIG. 10, being displayed. In step S105, setting of details regarding printing of the tab, such as arrangement (direction, position) of the title letters to be printed on the tab, font (typeface, style, size) and the like, is received according to the screen shown in FIG. 10.

Figure 11:
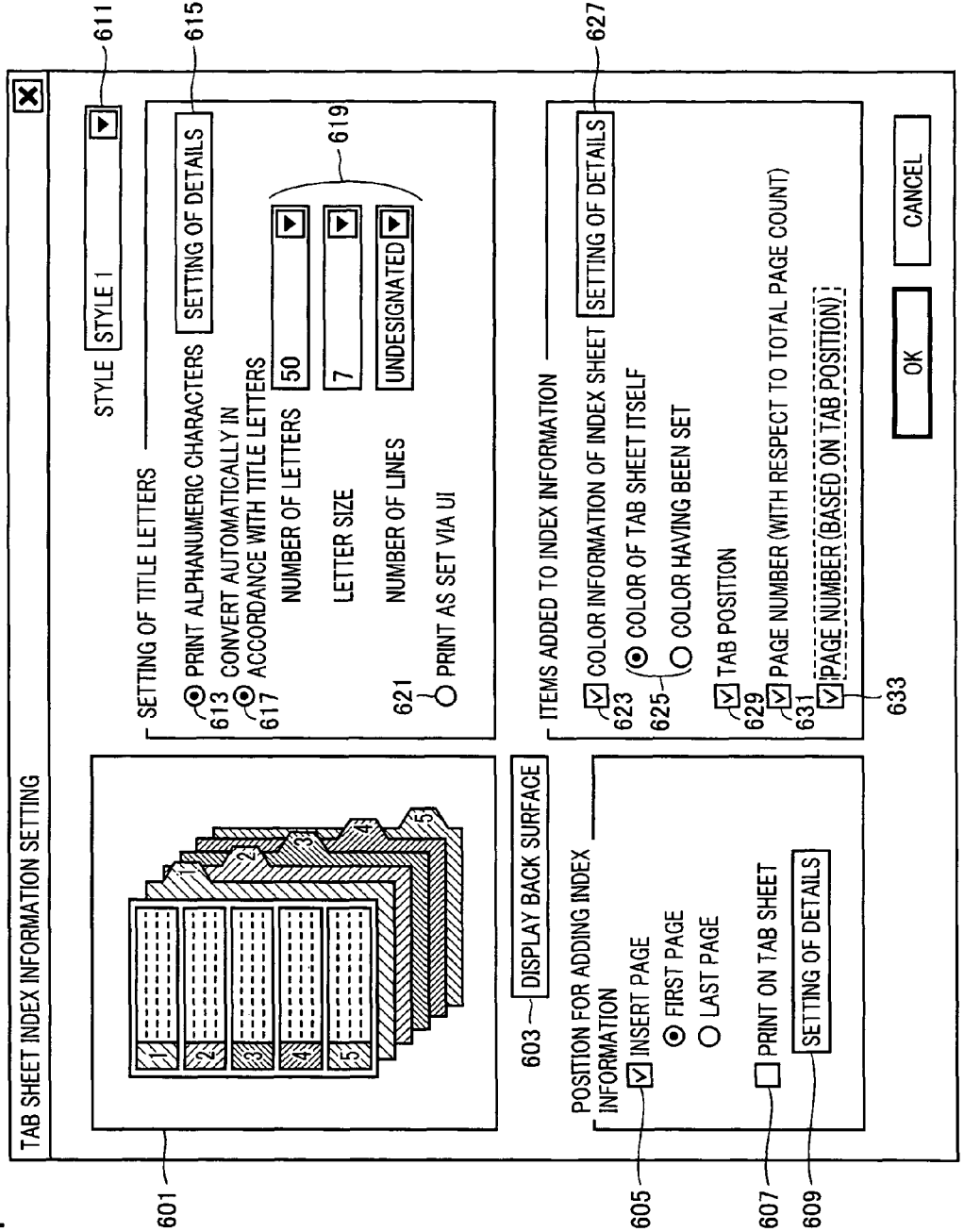
FIG. 11 shows a specific example of a screen for performing setting of printing of an index.

Next, when a button 511 for setting details of index printing is depressed on the per-page setting screen shown in FIG. 8, step S106 in the flowchart of FIG. 6 is executed, with a tab sheet index information setting screen, as shown in FIG. 11, being displayed.

By way of example, the screen for performing setting of index printing shown in FIG. 11 includes a preview screen 601 on which a preview of the tab sheet is displayed in accordance with the current settings, buttons 603-609, 613-617, 621-633, and input columns 611, 619.

Button 603 is used for switching the preview display on preview screen 601 from the front surface to the back surface, or from the back surface to the front surface.

Buttons 605-609 are used for designating a position for printing the index. Specifically, button 605 is used to instruct that a sheet of plain paper is inserted at the first or last page of document information to print index information thereon. Button 607 is used to instruct that index information is printed on a tab sheet. Button 609 is used for setting details of printing of the tab sheet, which will be described later. Button 613 is used to instruct that the letters to be printed on a tab are converted to alphanumeric character(s) upon printing of the index. Button 615 is used for setting details of printing of the alphanumeric characters, which will be described later. Button 617 is used to instruct automatic conversion from printing on a tab to printing on an index sheet, in accordance with the title information input to input column 307 of the per-page setting screen of FIG. 8. Button 621 is used to instruct that the title information is printed on a tab as indicated by the title information input to input column 307 on the per-page setting screen of FIG. 8.

Buttons 623-633 are used for setting information regarding the corresponding tab sheet, which is to be printed on an index sheet as index information in addition to the title information. Specifically, button 623 is used to instruct addition of information regarding the color of the corresponding tab sheet to the index information. Button group 625 is used for selecting which to add to the index information, the color of the corresponding tab sheet, or an arbitrary color that has been set. Button 627 is used to display a setting screen (not shown) to receive setting of details about the color of the tab sheet or an arbitrary color. Button 629 is used to add information regarding the tab position of the corresponding tab sheet to the index information. Button 631 is used to add information regarding the page number of the corresponding tab sheet with respect to a total page count, to the index information. Button 633 is used to add information regarding the page number of the corresponding tab sheet based on the tab position, to the index information.

Input column 611 is used to designate a style for printing the index, which is used for selecting a style format that is the template for use upon printing of the index. Further, a button for designating color, line type or thickness of the ruled line surrounding the index information, or a button for designating shape of the frame for printing the index information, as the style for printing the index, for example, may be provided in place of or in addition to the above-described input column.

Input column 619 is used for inputting a threshold value serving as the criterion as to whether the title information is to be printed on a tab sheet or on an index sheet.

Figure 12:
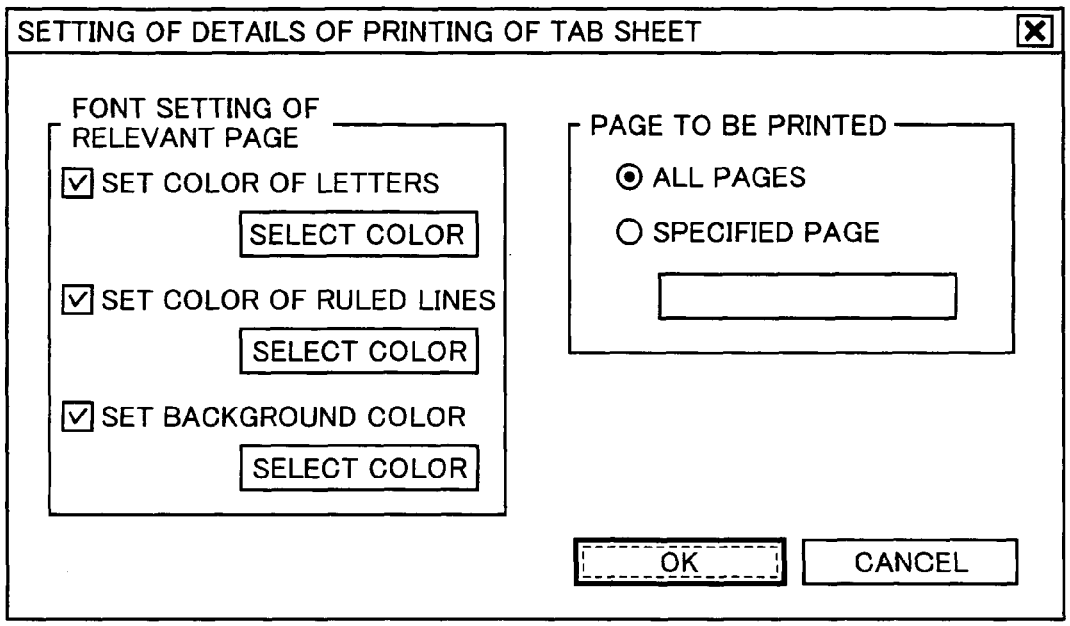
FIG. 12 shows a specific example of a screen for setting details of printing of a tab sheet.

Further, when button 609 is depressed, a screen for setting details of printing of a tab sheet for printing the index information on a tab sheet, as shown in FIG. 12, is displayed, and format setting such as the color of letters of the index information, color of the ruled lines, background color and the like is received. Here, by receiving the format setting for the index information separately from that for the other information printed on the tab sheet, the index information becomes more conspicuous than the remaining information, which facilitates the search for a desired tab sheet. Further, in the setting screen shown in FIG. 12, selection as to whether the index information is to be printed on all the tab sheets or on a tab sheet corresponding to the specified page, is received as well.

Figure 13:
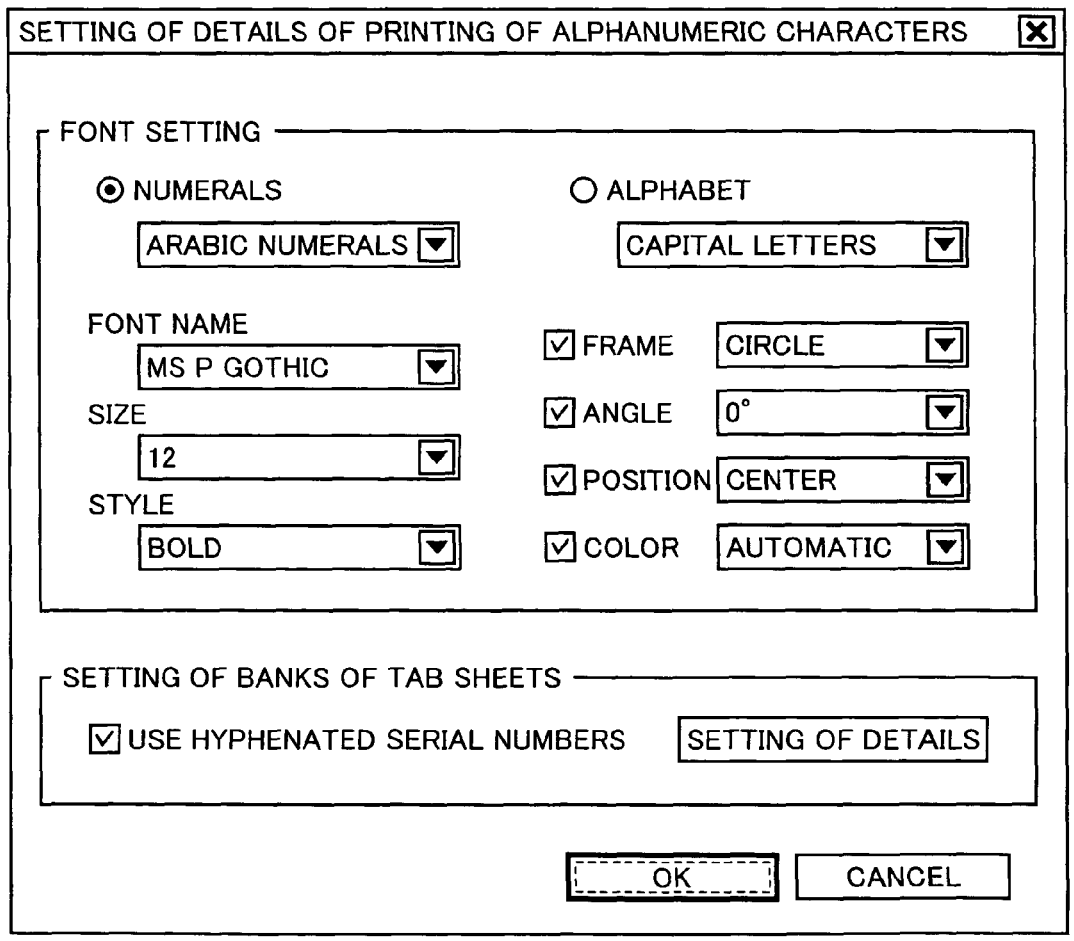
FIG. 13 shows a specific example of a screen for setting details of printing of alphanumeric characters.

Further, when button 615 is depressed, a screen for setting details of printing of alphanumeric characters, as shown in FIG. 13, is displayed. Specifically, when the title letters are to be converted to alphanumeric characters, selection as to whether they are converted to Arabic numerals, Chinese numerals, English capital letters, or English lower-case letters is received. Format setting of the font name, size, style, frame, angle, position, color and the like of the alphanumeric characters is also received. Further, in the case where it is set to use a set of tab sheets formed of a plurality of banks, setting for printing the alphanumeric characters in hyphenated serial numbers is received. For example, in the case of a set of tab sheets including five tabs at five different tab positions per bank, it can be set such that "1-1" is printed on the tab of the tab sheet of which tab position is the first from the top in the first bank, and "1-2" is printed on the tab of the tab sheet of which tab position is the first from the top in the second bank.

FIG. 11 shows the case where the number of letters and the number of lines of the title information input to input column 307 on the screen shown in FIG. 8, and the letter size set on the screen shown in FIG. 10 are set as the threshold values in input column 619. When the number of letters, the letter size and the number of lines of the title information set are equal to or greater than the values set in input column 619, then the title information to be printed on a tab is automatically converted to alphanumeric character(s). It is also possible to set all the threshold values of the number of letters, letter size and number of lines to be "undesignated". In this case, the title information to be printed on a tab is automatically converted to the alphanumeric character(s) when the printing volume of the title information exceeds the printing area of the tab. Further, in the case where the size and/or the number of lines of the title information set is to be automatically set in accordance with the printing area of the tab, only one of the number of letters, letter size and number of lines may be received as the threshold value in input column 619. By receiving the setting of the threshold value(s) in this manner, it is possible to avoid the undesirable situation where the title information of great quantity is printed on the printing area of the tab in a small letter size, leading to poor visibility, or the undesirable situation where all the title information cannot be printed in the printing area on the tab and a part of the title information is lost.

When setting in steps S101, S103, S105 and S106 is finished, and when an OK button is depressed on the screen shown in FIG. 8 to indicate completion of the setting (YES in step S107), the print control information as shown in FIG. 4 is generated in print control information generating unit 219 based on the contents set in steps S101-S106 (step S109), and the print control information thus generated is sent from print control information output unit 221 to printing device 1 (step S111).

An example of processing for generating the print control information in the above-described step S109 will now be described in detail using a flowchart in FIG. 7.

Referring to FIG. 7, firstly, print control information generating unit 219 reads the page number representing the tab sheet insert position from the above-described setting contents (step S301), and secures a memory for storing print control information for use in printing the title information to be printed on the tab sheet and/or the index information corresponding to the tab sheet (step S303). In the case where it has been set in the above setting such that printing on a tab portion is automatically switched to printing on an index sheet (YES in step S305), index conversion determining unit 209 determines whether the title information is to be printed on the tab portion or on the index sheet, based on the set threshold value(s). As a result, when the printing of the title information on the tab portion is switched to the printing on the index sheet (YES in step S307), tab sheet information generating unit 211 reads the alphanumeric character(s) from the above setting for replacement of the title information, and generates tab sheet information for printing the character(s) on the tab of the tab sheet (step S309). Further, index sheet information generating unit 213 reads the title information and the items to be added to the index information from the above settings, and generates index sheet information for printing the information on an index sheet (step S311).

Meanwhile, in the case where the automatic switching from the printing on the tab portion to the printing on the index sheet is not set (NO in step S305), or in the case where such switching from the printing of the title information on the tab portion to the printing on the index sheet is not effected as a result of determination of index conversion determining unit 209 (NO in step S307), i.e., when the title information is to be printed on the tab portion, then tab sheet information generating unit 211 reads the title information from the above settings, and generates tab sheet information for printing the title information on the tab of the tab sheet (step S313).

Print control information generating unit 219 generates print control information related to the tab sheet by using the tab sheet information generated in step S309 and the index sheet information generated in step S311, or by using the tab sheet information generated in step S313, and writes the same to the memory secured in step S303 (step S315).

The processing in steps S301-S315 is carried out for all the tab sheets to be printed, and when the processing of all the tab sheets is completed (YES in step S317), the processing of generating the print control information is completed, and the process returns to the processing shown in FIG. 6.

The items to be added to the index information, which are read from the above settings in step S311, may include, in the case shown by the screens of FIGS. 8 and 11, the page number indicating the insert position, tab position, color of the corresponding tab sheet, and the page number based on the tab position, set at input columns 503, 505 and buttons 623-633. Specific explanation will be made with reference to FIGS. 14 and 15.

Figure 14:
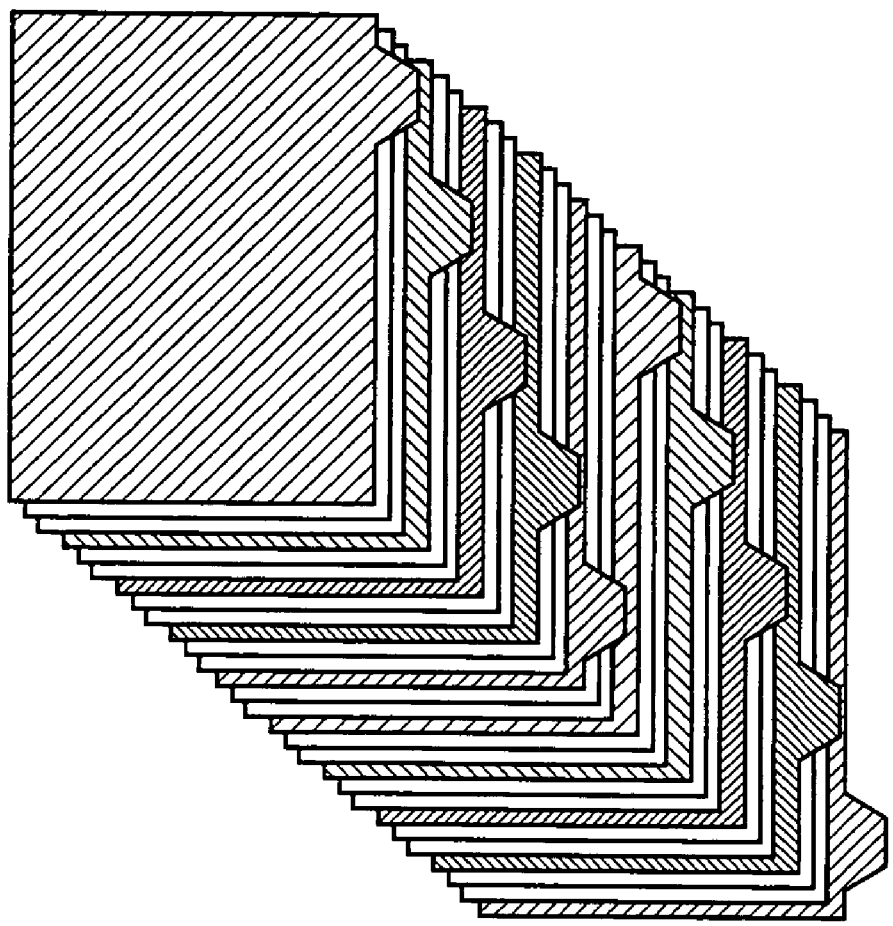
FIG. 14 illustrates a specific example of configuration of tab sheets.

Assume the case where it is set on the screens shown in FIGS. 8 and 9 that the number of tabs is five and two banks of five tab sheets with five different tab positions are used, i.e., assume that the configuration of the tab sheets is as shown in FIG. 14. Further, assume that it is set such that the color information of the corresponding tab sheet is added to the index information using buttons 623, 625 on the screen shown in FIG. 11, and that button 627 is used to set, corresponding to the tab positions, the color of the tab sheet having the first tab position from the top to be grey, the color of the tab sheet having the second tab position to be green, the color of the tab sheet having the third tab position to be yellow, the color of the tab sheet having the fourth tab position to be orange, and the color of the tab sheet having the fifth tab position to be light blue. Still further, assume that input column 303 on the screen of FIG. 8 is used to set the insert position of each tab sheet as follows: page 1 for the first tab sheet, page 10 for the second tab sheet, page 20 for the third tab sheet, . . . , and page 90 for the tenth tab sheet (left column of FIG. 15).

Furthermore, in the case where it is set such that the information regarding the title position, the information regarding the page number of the corresponding tab sheet with respect to a total page count, and the information regarding the page number of the corresponding tab sheet based on its tab position, are to be added to index information using buttons 629, 631 and 633 in FIG. 11, index sheet information having the information as shown on the right of FIG. 15 in addition to the title information is generated in the above-described step S311. Specifically, the information regarding the "tab position" representing what number from the top among the five tab positions the tab position of the corresponding tab sheet is, the information regarding the "page number with respect to a total page count" representing what page number the corresponding tab sheet is among the total pages (90 pages) to be printed, and the information regarding the "page number based on the tab position" representing which bank the corresponding tab sheet belongs to among the whole banks (2 banks) of the tab sheets to be used, are added to the index information.

Figure 16:
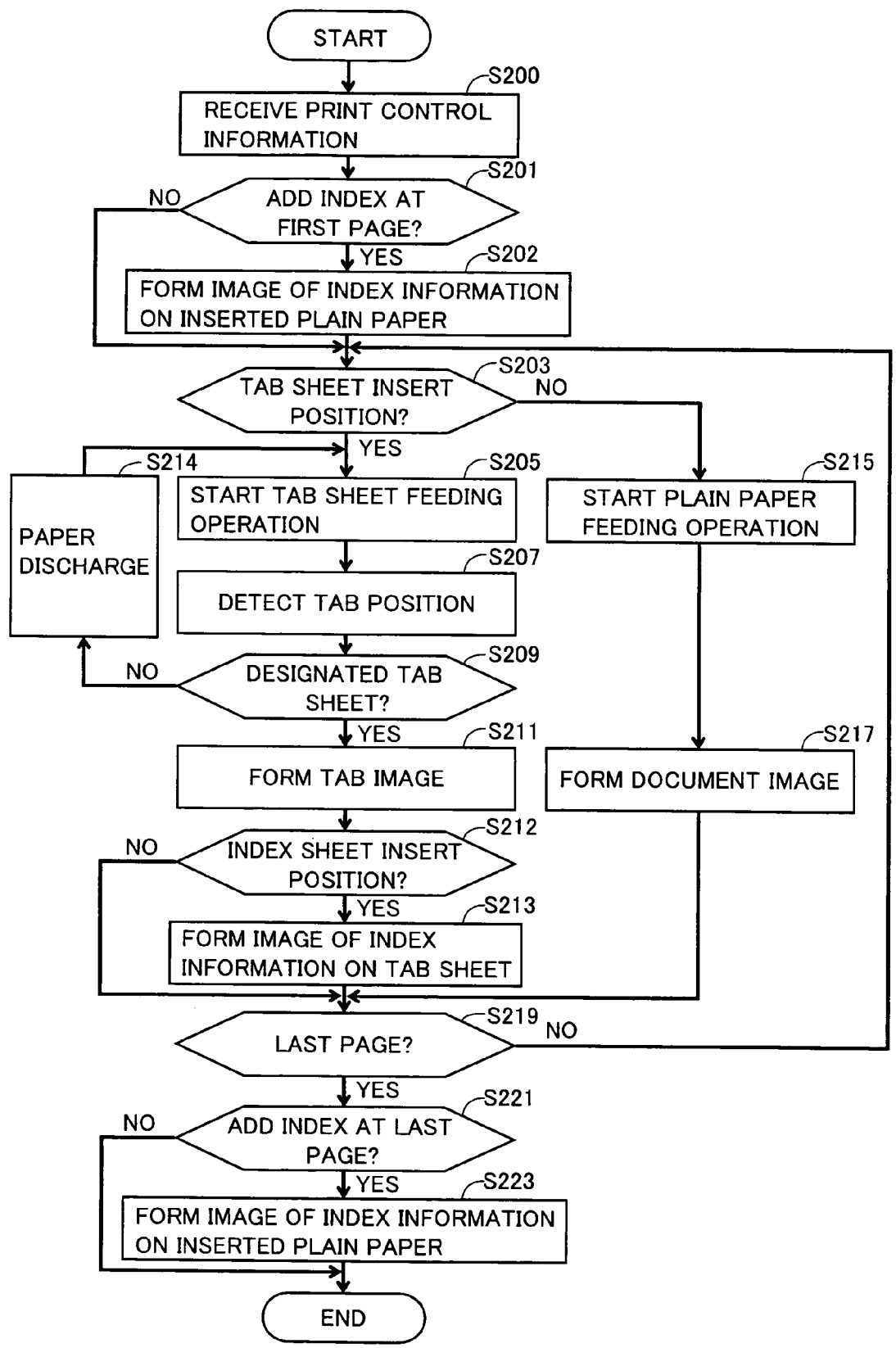
FIG. 16 is a flowchart showing processing executed by printing device 1 for performing printing using a tab sheet.

Processing executed by printing device 1 of the present embodiment for performing printing using a tab sheet, shown by a flowchart in FIG. 16, is implemented as CPU 10 of printing device 1 reads and executes a program stored in storage unit 20 or the like to control the respective units shown in FIG. 5.

Referring to FIG. 16, when the print control information sent from PC 3 via NIC 15 is received (step S200) and input from print control information input unit 301, firstly, index insert position determining unit 317 determines whether setting of printing the index information by inserting a sheet of plain paper at the first page of the document to be printed has been set or not, based on the index sheet information included in the print control information (step S201). If it is determined that such setting has been made (YES in step S201), index sheet image forming unit 315 forms an image for printing the index information on the sheet of plain paper inserted in accordance with an instruction of paper feed instructing unit 309 (step S202). If it is determined that such setting has not been made (NO in step S201), the process of step S202 is skipped.

Next, tab sheet insert position determining unit 307 determines, for each page, whether the relevant page corresponds to the page for inserting a tab sheet, based on the tab sheet information included in the print control information (step S203).

If it is determined to be the page for inserting a tab sheet (YES in step S203), a tab sheet feeding operation is started in accordance with an instruction from paper feed instructing unit 309 (step S205). It is then determined by tab sheet shape determining unit 311 whether the fed sheet is the tab sheet of a designated shape (step S207). If it is not the tab sheet of the designated shape, it is discharged to the paper discharge tray for use in discharging an undesignated sheet (NO in step S209, and S214). Steps S205, S207, S209 and S214 are repeated until the tab sheet of the designated shape is fed. When it is determined by tab sheet shape determining unit 311 that a tab sheet of the designated shape has been fed (YES in step S209), a tab sheet image is formed by tab sheet image forming unit 305, based on the tab sheet information identified as the commands included in the print control information (step S211). It is then determined whether it is the position for inserting an index sheet. If so (YES in step S212), an image for printing the index information on the tab sheet is formed (step S213). If not (NO in step S212), the processing of step S213 is skipped.

Meanwhile, if it is determined in step S203 that the page does not corresponds to the page for inserting a tab sheet but corresponds to the page for printing document information on a sheet of plain paper (NO in step S203), a plain paper feeding operation is started in accordance with an instruction from paper feed instructing unit 309 (step S215), and a document image is formed by document image forming unit 303, based on the text information and the information of header and the like included in the print control information (step S217).

If the page for which the image was formed in the above processing is not the last page (NO in step S219), the process returns to step S203, and the above processing is repeated until the last page is processed.

When the last page is processed (YES in step S219), index insert position determining unit 317 determines whether it is set such that a sheet of plain paper is inserted next to the last page of the document as the printing target for printing the index information, based on the index sheet information included in the print control information (step S221). If it is determined that such setting has been made (YES in step S221), index sheet image forming unit 315 forms an image for printing the index information on the sheet of plain paper inserted by an instruction of paper feed instructing unit 309 (step S223). If it is determined that such setting has not been made (NO in step S221), the processing in step S223 is skipped, and a series of processing is terminated.

Figure 17:
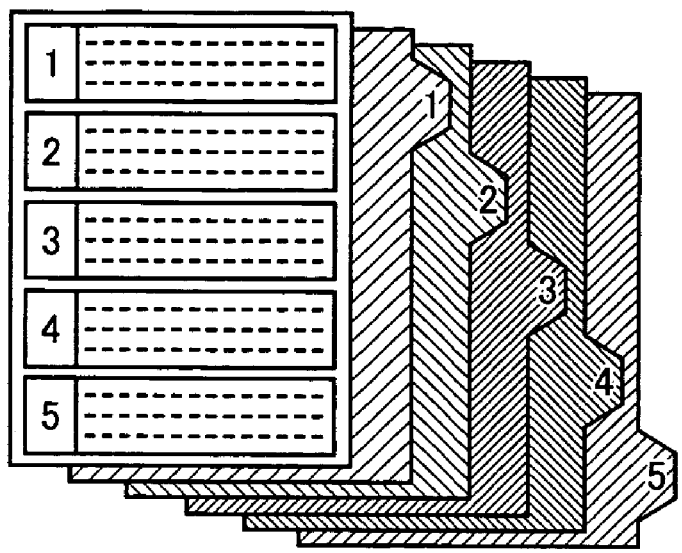
FIGS. 17-20 show output examples of indexes.
Figure 18:
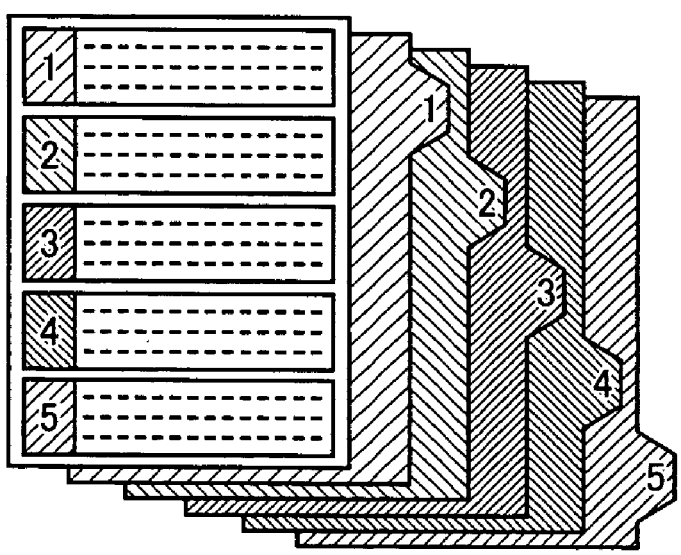
Figure 19:
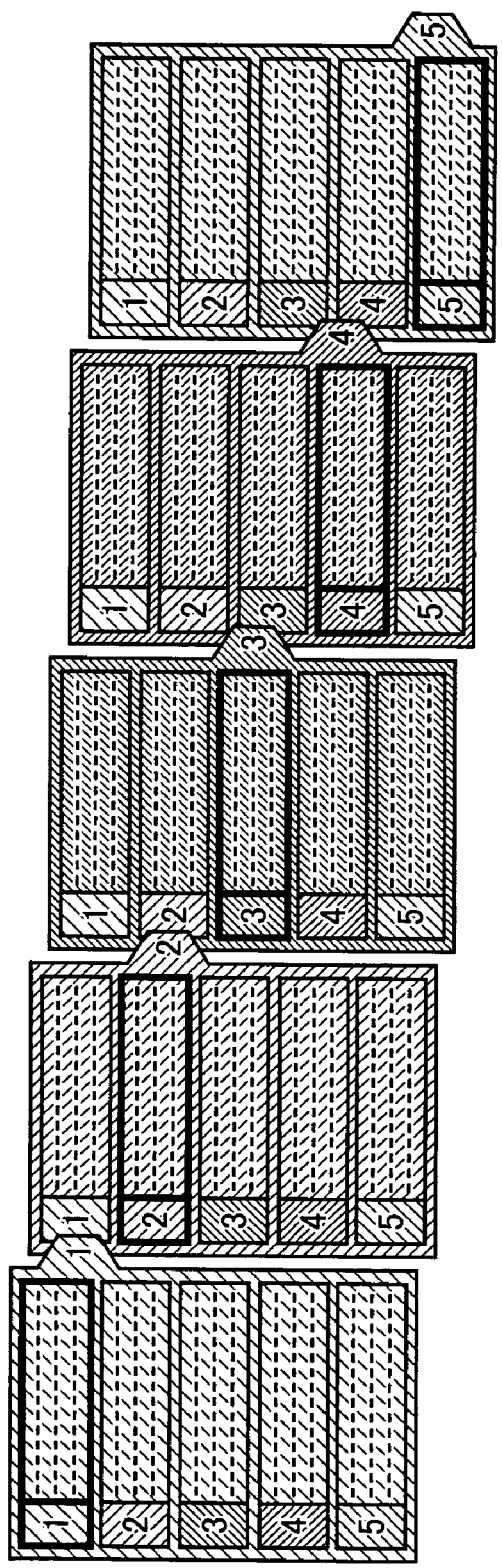

Specific examples of indexes output according to the above processing are shown in FIGS. 17-19. FIG. 17 shows an output example in which the index information is printed on a sheet of plain paper inserted at the first page of the document as an index sheet, and the title information converted into a numeral is printed on a tab of each tab sheet. FIG. 18 shows an output example in which the color of the corresponding tab sheet is added to each item of the index information. FIG. 19 shows an output example in which the index information is printed on each tab sheet as an index sheet, the title information converted into a numeral is printed on a tab of each tab sheet, the color of the corresponding tab sheet is added to each item of the index information, and the ruled line surrounding the item of the index information corresponding to the printed tab sheet is applied with a color (red in FIG. 19) different from the color of the ruled lines surrounding the remaining items of the index information.

Printing the index information in the above-described manner facilitates the search for a required tab sheet, without impairing the visibility of the information printed on the tab of the tab sheet.

Figure 20:
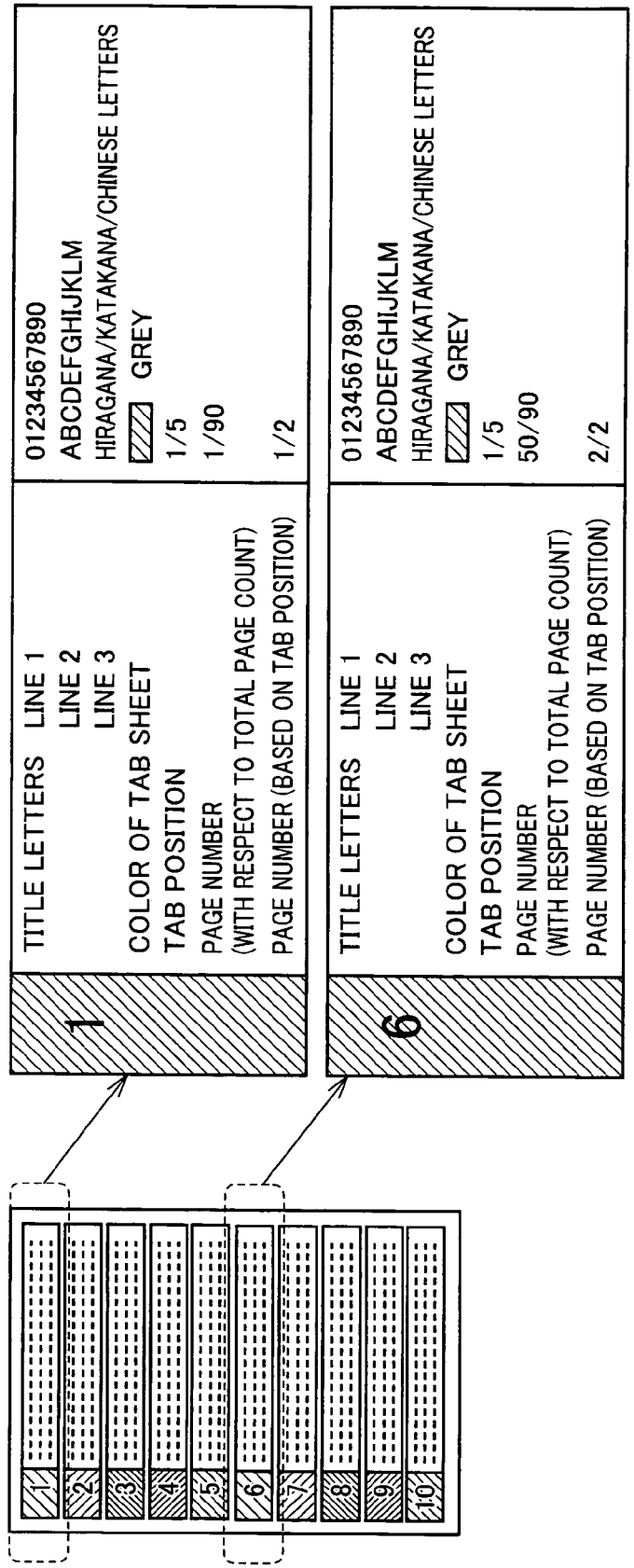

FIG. 20 shows, on the left side, a specific example of an index output when the page number and others are added to the index information. The index sheet shown is a sheet of plain paper inserted to the first or last page of the document. FIG. 20 shows, on the right side, a specific example of the contents of each item of the index information, in which the numeral printed on the tab of the corresponding tab sheet is printed and the color of the corresponding tab sheet is added. Each item of the index information also includes, in addition to the text information set as the title information, information of the corresponding tab sheet, such as information of the color applied to the tab sheet, information regarding the tab position of the tab sheet, information regarding the page number with respect to a total page count, and information regarding the page number based on the tab position. Thus adding the information regarding the corresponding tab sheets to the index information further facilitates the search for desired information by referring to the index information.

It is noted that the configurations of printing device 1 and PC 3 shown in FIGS. 3 and 5 and described above correspond to a specific example of configuration of the print system of the present embodiment; the configuration for implementing the present invention is not restricted thereto. Specifically, at least a part of the functional configuration of PC 3 shown in FIG. 3 may be included in printing device 1, or at least a part of the functional configuration of printing device 1 shown in FIG. 5 may be included in the PC 3 side. Further, printing device 1 and PC 3 may be implemented as a single device, and the above-described print control apparatus may be included in the printing device. Still further, the processing illustrated in FIGS. 6, 7 and 16 may be executed by either device. The present invention may include any combination of the functions provided for the devices and any combination of the processing executed by the devices. As a specific example, document image forming unit 303, tab sheet image forming unit 305, tab sheet insert position determining unit 307, tab sheet shape determining unit 311, index sheet image forming unit 315, and index insert position determining unit 317 may be included in the PC 3 side. At this time, PC 3 may determine whether the shape of the tab sheet is the designated shape based on the sensing signal of sensor 353 of printing device 1, and form a document image, a tab sheet image or an index sheet image based on the result, and output the image data to printing device 1 for printing. In this case, of the processing shown in FIG. 16, steps S201-203, S209, S211 and S217-S223 are executed by PC 3.

With the configuration described above, the print control apparatus according to the present invention causes the printing device to print an index based on the information to be printed on the tab, as required. This ensures that information of large quantity can be presented, without impairing visibility of the tab. Further, associating the index with the tab facilitates the search for a desired tab sheet.

Further, it is also possible to provide a program for causing a computer to carry out the above-described processing. Such a program may be recorded on a computer-readable recording medium such as a flexible disk, CD-ROM, ROM, RAM or memory card attached to the computer, and provided as a program product. Alternatively, the program may be provided by recording the same on a recording medium such as a hard disk built in the computer. The program may also be provided by downloading via a network.

The program of the present invention may be one that calls necessary modules at prescribed timings in a prescribed sequence from among the program modules provided as a part of the operation system (OS) of the computer, to cause the processing to be executed. In this case, the modules are not included in the program itself, and the processing is executed in cooperation with the OS. Such a program not containing the modules may be included in the programs of the present invention.

Further, the program of the present invention may be provided in a manner incorporated in a part of another program. In this case as well, modules included in the other program are not included in the program itself, and the processing is executed in cooperation with the other program. Such a program incorporated in another program may also be included in the programs of the present invention.

The program product provided is installed in a program storage unit such as a hard disk for execution. The program product includes the program itself and a recording medium on which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A print control apparatus controlling a printing device performing printing on a tab sheet identified as a print sheet having a tab, comprising:
    an input unit inputting title information identified as information to be printed on said tab;
    a determining unit configured to determine whether to convert said title information into index information by judging whether a printing volume of the title information exceeds a printing area of the tab of the tab sheet, based on a threshold value; and
    a first generating unit configured to generate control information for printing said index information including said title information and a symbol associated with said title information on an index sheet, which is separate from said tab sheet, and for printing said symbol on said tab of said tab sheet when said determining unit determines to convert said title information into said index information and for printing said title information on said tab of said tab sheet when said determining unit determines not to convert said title information into said index information.

2. The print control apparatus according to claim 1, further comprising:
    a threshold value setting unit configured to set said threshold value.

3. The print control apparatus according to claim 2, wherein said threshold value corresponds to at least one of the number of letters, size of the letters, and the number of lines to be printed on said tab.

4. The print control apparatus according to claim 1, further comprising a second generating unit generating control information for printing a symbol associated with said index information on said tab instead of said title information.

5. The print control apparatus according to claim 4, further comprising a format setting unit setting a format of said symbol.

6. The print control apparatus according to claim 1, wherein said control information generated by said first generating unit is for printing said index information added with information regarding said tab sheet on said index sheet.

7. The print control apparatus according to claim 6, wherein said information regarding said tab sheet includes at least one of information regarding a color applied to said tab sheet, information regarding a position of said tab, and information regarding an insert position of said tab sheet in a document to be printed.

8. The print control apparatus according to claim 1, further comprising a designating unit designating said tab sheet or a print sheet different from said tab sheet as said index sheet.

9. The print control apparatus according to claim 1, wherein said control information generated by said first generating unit is for printing said index information corresponding to said tab sheet in a style different from a style of the index information corresponding to another tab sheet, when said index information is to be printed on said tab sheet as said index sheet.

10. The print control apparatus according to claim 9, further comprising a style setting unit setting said style.

11. The print control apparatus according to claim 1, wherein said control information includes a first command for forming an image to be printed on said tab sheet, a second command for forming an image to be printed on said index sheet, and document information to be printed,
    said print control apparatus further comprising:
    an index insert position determining unit determining whether a page to be processed corresponds to a page to be printed on said index sheet or not, based on said control information;
    a tab sheet insert position determining unit determining whether the page to be processed corresponds to a page to be printed on said tab sheet or not, based on said control information;

a paper feed instructing unit instructing said printing device to feed a tab sheet when it is determined that said page to be processed corresponds to the page to be printed on said tab sheet;

a sheet shape determining unit determining whether the fed sheet is a designated tab sheet or not;

a first image forming unit forming an image to be printed on said tab sheet in accordance with said first command included in said control information when it is determined that said fed sheet is the designated tab sheet; and a second image forming unit forming an image to be printed on said index sheet in accordance with said second command included in said control information when it is determined that said page to be processed corresponds to the page to be printed on said index sheet.

12. A print control program product causing a computer to execute processing for controlling a printing device performing printing on a tab sheet identified as a print sheet having a tab, said processing including the steps of:

presenting an input screen to a user and receiving an input of title information identified as information to be printed on said tab according to said input screen;

determining whether to convert said title information into index information by judging whether a printing volume of said title information exceeds a printing area of said tab of said tab sheet, based on a threshold value; and generating control information for printing said index information including said title information and a symbol associated with said title information on an index sheet, which is separate from said tab sheet, and for printing said symbol on said tab of said tab sheet when the determining step determines to convert said title information into said index information and for printing said title information on said tab of said tab sheet when said determining step determines not to convert said title information into said index information.

13. A print control method for controlling a printing device performing printing on a tab sheet identified as a print sheet having a tab using a print control apparatus, comprising:

a step of presenting an input screen to a user and receiving an input of title information identified as information to be printed on said tab according to said input screen;

a step of determining whether to convert said title information into index information by judging whether a printing volume of said title information exceeds a printing area of said tab of said tab sheet, based on a threshold value; and a first generating step of generating control information for printing said index information including said title information and a symbol associated with said title information on an index sheet and for printing said symbol on said tab of said tab sheet when said determining step determines to convert said title information into said index information and for printing said title information on said tab of said tab sheet when said determining step determines not to convert said title information into said index information.

14. The print control method according to claim 13, further comprising:

a step of setting a threshold value; and a step of determining whether or not to convert said title information into said index information based on said threshold value.

15. The print control method according to claim 13, further comprising a second generating step of generating control information for printing a symbol associated with said index information on said tab instead of said title information.

16. The print control method according to claim 13, wherein said control information generated in said first generating step is for printing said index information added with information regarding said tab sheet on said index sheet.

17. The print control method according to claim 13, wherein said control information includes a first command for forming an image to be printed on said tab sheet, a second command for forming an image to be printed on said index sheet, and document information to be printed, said print control method further comprising:

a step of determining whether a page to be processed corresponds to a page to be printed on said index sheet or not, based on said control information;

a step of determining whether the page to be processed corresponds to a page to be printed on said tab sheet or not, based on said control information;

a step of instructing said printing device to feed a tab sheet when it is determined that said page to be processed corresponds to the page to be printed on said tab sheet;

a step of determining whether the fed sheet is a designated tab sheet or not;

a step of forming an image to be printed on said tab sheet in accordance with said first command included in said control information when it is determined that said fed sheet is the designated tab sheet; and a step of forming an image to be printed on said index sheet in accordance with said second command included in said control information when it is determined that said page to be processed corresponds to the page to be printed on said index sheet.

* * * * *